United States Patent [19]
Bowman

[11] Patent Number: 4,967,041
[45] Date of Patent: Oct. 30, 1990

[54] FLOOR BOX FOR ACCESS FLOORS

[75] Inventor: Timothy S. Bowman, Parkersburg, W. Va.

[73] Assignee: Butler Manufacturing Company, Kansas City, Mo.

[21] Appl. No.: 318,699

[22] Filed: Mar. 3, 1989

Related U.S. Application Data

[62] Division of Ser. No. 95,437, Aug. 24, 1987, abandoned.

[51] Int. Cl.5 .................................................. H02G 3/18
[52] U.S. Cl. ...................................... 174/48; 174/65 R
[58] Field of Search ................... 174/48, 65 R, 65 G; 52/221

[56] References Cited

U.S. PATENT DOCUMENTS

| | | | |
|---|---|---|---|
| 3,482,032 | 12/1969 | McVoy, Jr. | 174/65 R |
| 3,787,605 | 1/1974 | Van Gessel et al. | 174/65 R X |
| 3,895,178 | 7/1975 | Huibrechtse | 174/48 |
| 3,896,960 | 7/1975 | Schindler et al. | 174/48 X |
| 4,443,654 | 4/1984 | Flachbarth et al. | 174/48 |
| 4,591,656 | 5/1986 | Mohr | 174/48 |
| 4,721,476 | 1/1988 | Zeliff et al. | 174/48 X |

Primary Examiner—Leo P. Picard
Assistant Examiner—David A. Tone
Attorney, Agent, or Firm—Frederick J. Olsson

[57] ABSTRACT

Cable management system for flush floor fitting. The fitting has a retainer opening (adapted to pass cable) in communication with the normal access opening. The fitting cover has an opening (adapted to pass cable) which is aligned with retainer opening when the cover is in closed position. The retainer opening receives a wire retainer or cable management block. Key and keyway means permit the wire retainer to be oriented to allow passage of cable or alternatively to be oriented to block passage of cable.

11 Claims, 5 Drawing Sheets

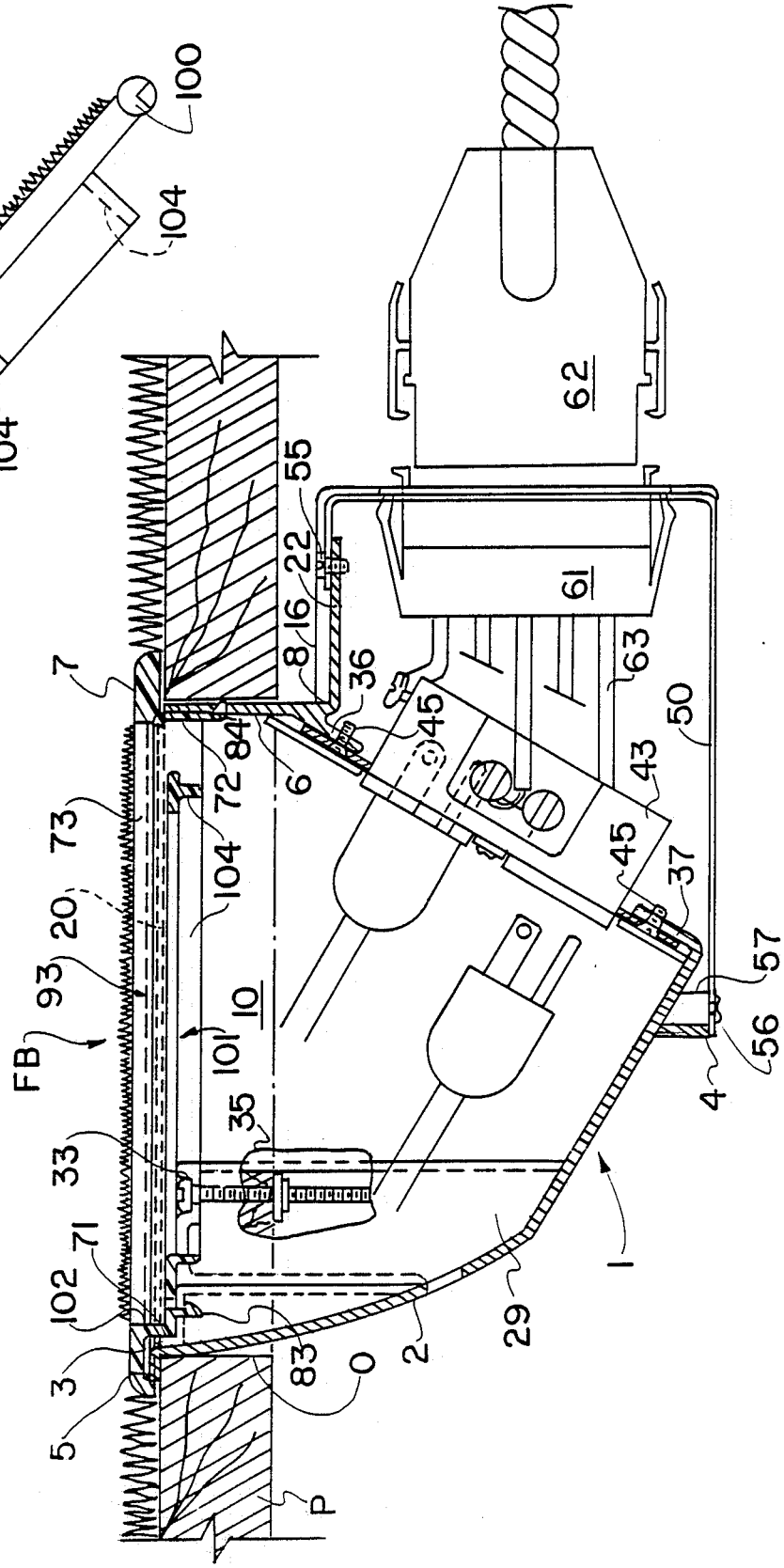

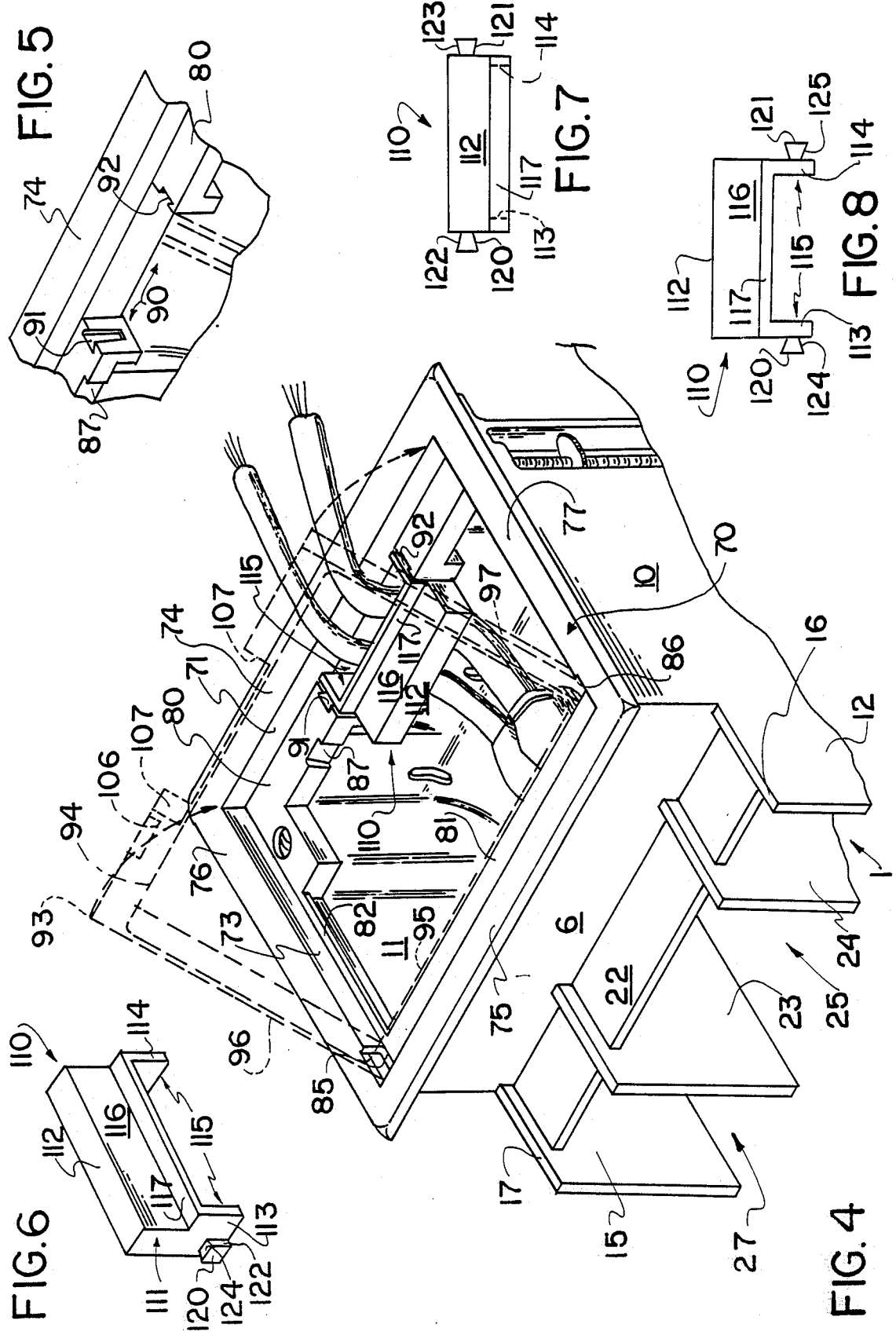

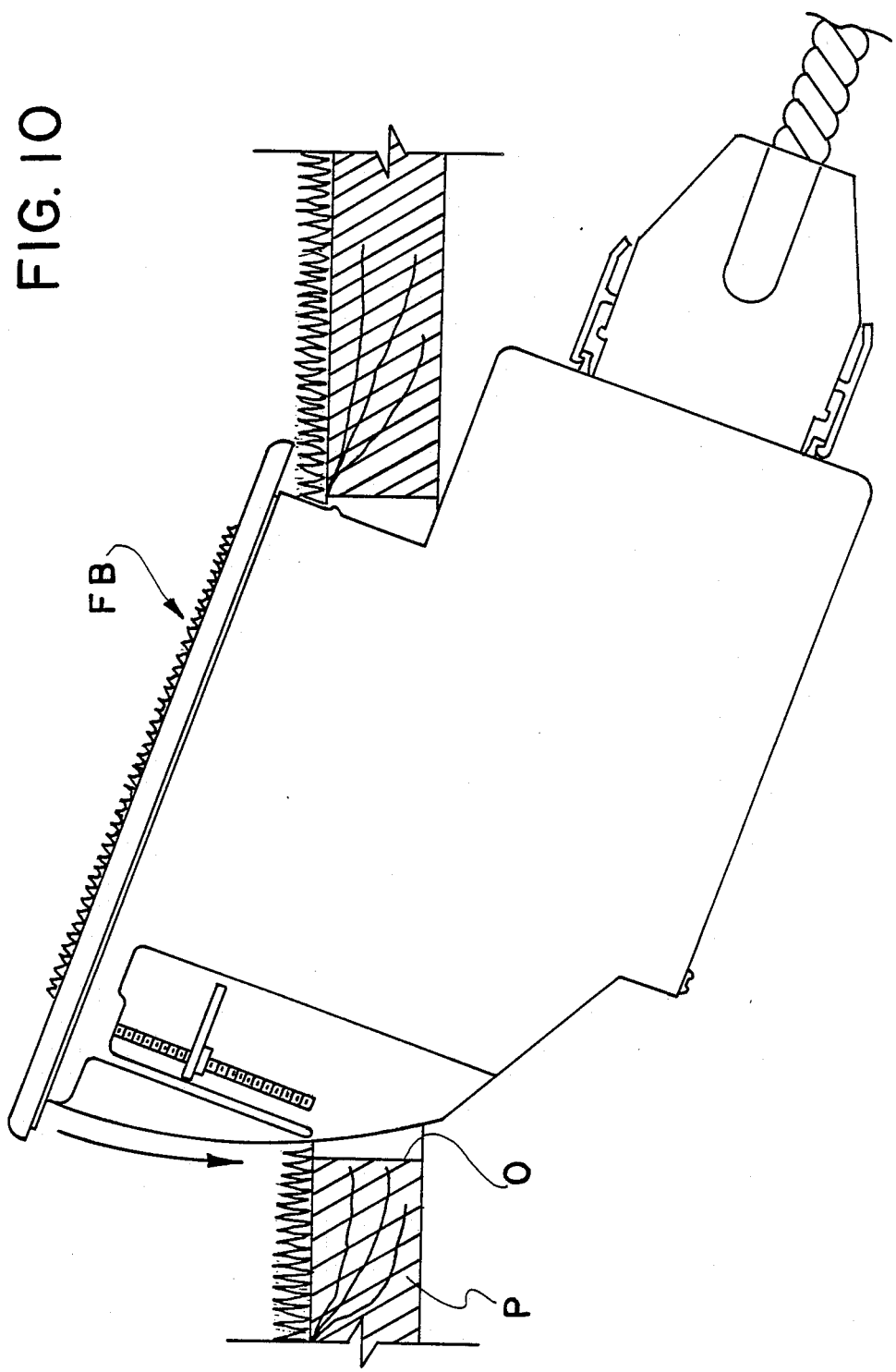

FLOOR BOX FOR ACCESS FLOORS

This application was filed as a divisional application of then copending application Ser. No. 95,437 filed Aug. 24, 1987 which has been abandoned.

The invention relates in general to electrical underfloor or infloor systems for high tension and low tension distribution in office buildings and the like.

More specifically the invention relates to a flush floor outlet fitting having a wire retainer to manage the cable serviced by the fitting.

In the underfloor art, flush floor outlet fittings provide a substantially flush or unobstructed condition at the work station areas in contra-distinction to the condition arising out of the use of above-the-floor or tombstone fittings. Flush floor outlet fittings may be for single service or dual service. The receptacles and/or jacks are either the recessed mounted or the flush mounted. The wire retainer of the invention may be employed in any of the foregoing fittings for managing high and low tension cable.

According to the invention a flush floor fitting is provided with a retainer opening which is in communication with the normal cable access opening in the fitting and is provided with a wire retainer or cable management block to occupy the retainer opening. The wire retainer can condition the fitting for an active condition wherein cable is passed from under the floor to the surface or alternatively can condition the fitting for an inactive or abandonment condition wherein passage of cable is blocked.

The retainer opening and retainer are provided with compatible key/keyway means which permit the retainer to be inserted in the opening to establish one condition or alternative to be inserted to establish the other condition.

Preferably, the retainer opening is mounted on a side of the fitting frame, although as the description proceeds, it will be evident the retainer opening can be mounted on the fitting cover. The terms flush floor outlet fitting and flush floor fitting are synonymous.

The invention is shown herein as it may be used with an access floor box and is described in that context in connection with the following drawings wherein:

FIG. 1 is a side elevational view partially in section illustrating the floor box as mounted in an access floor;

FIG. 2 is side elevational view of the cover of the floor box of FIG. 1 in an open position;

FIG. 4 is a partial perspective view of the housing and cover frame showing the position of the wire retainer for permitting passage of cables.

FIG. 5 is a fragmentary view showing the opening in the cover frame for the passage of cables;

FIG. 6 is a perspective view of the wire retainer;

FIG. 7 is a plan view of the wire retainer shown in FIG. 6;

FIG. 8 is an elevational view of the wire retainer shown in FIG. 6;

FIG. 10 is a side elevation to illustrate how the floor box is inserted in the opening in a floor panel.

As depicted in FIG. 1, the panel of the access floor is indicated at P and an access opening 0 receives the floor box FB.

Figure 3:
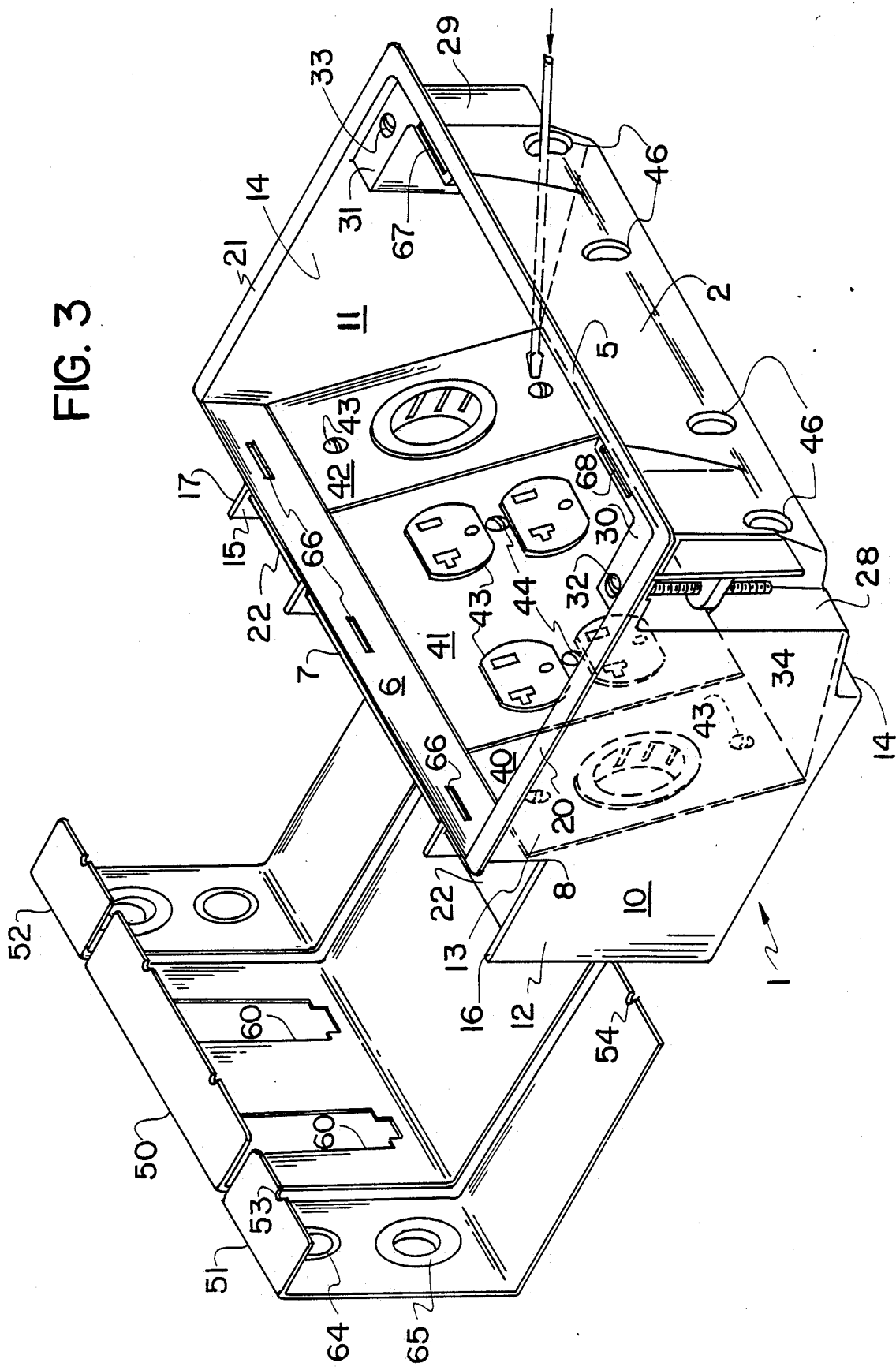
FIG. 3 is an exploded perspective view of housing components of the floor box of FIG. 1.

The floor box FB has the housing 1 and the structure of the housing will be explained with particular reference to FIGS. 1, 3, and 4.

The housing 1 has a front wall 2 having a top edge 3 and a bottom edge 4. The top edge 3 has an outwardly extending flange 5. A flat back wall 6 has a top edge 7 and a bottom edge 8. The housing also has a pair of flat, parallel side walls 10 and 11.

Each of the side walls 10 and 11 have upper and lower sections. For example, the side wall 10 has lower section 12 and upper section 3. As noted, the lower section 12 extends outwardly from the bottom edge 8 of the back wall 6. The side wall 11 is similarly constructed having upper section 14 and lower section 15. The lower sections 12 and 15 have top edges 16 and 17.

The upper section 13 terminates in a top edge which has an outwardly extending flange 20 and the upper section 14 terminates in a top edge which has an outwardly extending flange 21. The flanges 5, 20, and 21 are coplanar. The purpose of these flanges is to engage the edges of the opening O and thereby mount the floor box FB on the access floor panel P as will be evident from FIG. 1.

A flat back foot 22 is connected to the bottom edge 8 of the back wall 6 and extends outwardly and is connected respectively adjacent but just below top edges 16 and 17 of the lower extensions of the side walls as best seen in FIG. 4.

It will be observed that the front wall 2 arcuately converges from the top edge 3 downwardly to the bottom edge 4.

From the foregoing, it will be evident that the front 2, back 6, and side walls 10 and 11 form a generally rectangular shaped chamber with the respective top edges forming an opening bordered in part by the flanges 5, 20, and 21.

With particular reference to FIG. 4 and FIG. 1, it will be seen that a pair of spaced apart barriers 23 and 24 extend inwardly and are parallel to the side walls 10 and 11. On the top, the barrier are joined to the back foot 22 and extend inwardly to the bottom edge 8. On the bottom the barriers are coplanar with the bottom of the side walls 10 and 11 and extend inwardly and are joined with the bottom edge 4.

The space between the barrier 23 and 24 forms a power channel 25. The space between the side wall 10 and barrier 24 forms a communication and/or data channel 26 and the space between the barrier 23 and side wall 11 forms a communication and/or data channel 27.

At opposite ends of the front wall 2 are formed exterior pockets 28 and 29. The tops 30 and 31 of the pockets lie within the chamber and have clearance holes to receive locking tab screws 32 and 33. These screws extend down into the pockets 28 and 29 and have locking tabs 34 and 35. The purpose of the locking tabs is to fit up under the panel P (FIG. 1) and secure the housing in position. Referring to FIG. 1, it will be seen that a top support 36 is positioned adjacent the bottom edge 8 of the back wall 6 and is coextensive with the bottom edge 8. A bottom support 37 is positioned adjacent the bottom edge 4 of the front wall 2 and is coextensive with the bottom edge 4.

The supports 36 and 37 mount the electrical plates 40 and 42. The plates 40 and 42 are communication/data plates and are secured by screws 43 threaded into the top support 36 and lower support 37. The plate 41 is a receptacle cover plate which is secured to receptacles 43 by screws 44, the tabs of the receptacles being connected to the top and lower supports 36 and 37 by screws 45.

It will be noted that the plates 40, 41, and 42 are oriented at an angle so that direct contact with the screws through the opening in the chamber is difficult. Thus, I have provided apertures 46 in front wall. The shank of a screw driver (see FIG. 3) can be inserted through these apertures so the head can contact the screws.

The power channel 25 is provided with a cover 50 and the communication/data channels 26 and 27 are provided with covers 51 and 52. The covers 51 and 52 are extensions of the back wall 6. The top edge and the bottom edge of each cover has half moon clearance holes such as the holes 53 and 54 for the cover 51. These half moon holes receive screws (FIG. 1) such as the screws 55 threaded in the back foot 22 and the screw 56 threaded into the boss 57 adjacent the bottom edge 4 of the front wall. There are two additional bosses like the boss 57 for the screws for covers 51 and 52.

The cover 50 for the power channel has openings 60 which receive wire connectors such as the wire connector 61. These wire connectors or receptacles are of the type shown in copending application of R. D. Benscoter et al Ser. No. 480,470 now U.S. Pat. No. 4,857,016. The wire connector is adapted to receive a cable head 62 also of the type shown in application Ser. No. 480,470 now U.S. Pat. No. 4,857,016. The receptacle 43 is electrically connected to the wire connector 61 by conductors 63.

The communication/data covers 51 and 52 have knockouts to receive grommets for passing the communication/data cables. For example, see knockout 64 and grommet 65 for cover 51.

The floor box cover and frame assembly will now be described, but first I will refer to means in the housing 1 to secure the assembly in place. Back wall 6 has a plurality of slots 66 which are respectively adapted to receive a keeper finger. The tops of pockets 28 and 29 are formed with slots 67 and 68 which receive headed snap fingers. The heads engage the underside of the tops 30 and 31.

The cover frame is indicated at 70 and is rectangular in shape so as to fit into the opening to the housing. The frame has a front wall 71 rear wall 72, and side walls one of which is shown at 73. The tops of the foregoing side walls are coplanar and form a frame top and extending outwardly therefrom are flanges indicated at 74, 75, 76, and 77 which are also coplanar. On the lower part of each of the side walls is an inwardly extending cover support flange, the front and rear cover support flanges being indicated at 80 and 81 and the cover support flange on side wall 73 being indicated at 82. The side walls and support flanges form a recessed area to receive a cover as noted later.

On the underside of front support flange 80 there are a pair of snap latches one of which is indicated at 83 in FIG. 1. These snap latches are received in the slots 67 and 68 in the housing with each head of the latch engaging the underside of the housing.

The bottom of the rear side wall 72 of the frame carrier has three horizontally extending fingers such as the finger 84 shown in FIG. 1. The fingers are received in slots 66 in the back wall 6.

It will be evident that with the rear fingers 84 in the slots 66 and the front latches 83 engaged with the housing, the cover frame is held in position. It also will be apparent that with the foregoing arrangement, the cover frame can be quickly connected to the housing.

The side walls of the cover frame adjacent the rear wall 72 are formed with U-shaped pivot carriers 85 and 86. The pivot carriers are arranged to receive pivot shafts on the cover as will be commented on later. Additionally, the front flange 80 is formed with a slot 87 to provide room for a latch finger on the cover to move into position as will be noted later.

The front flange 80 is formed with an opening 90 (FIG. 5). At each end of the opening 90 is a vertically extending dovetail keyway as indicated at 91 and 92. These keyways face one another and are parallel As noted for the keyway 91, the keyway is closed at the bottom and open at top. These keyways are adapted to receive keys in a wire retainer which will be explained shortly.

The cover or cover frame 93 is rectangular in shape and includes four side walls, the front and back being indicated at 94 and 95 and the walls interconnecting same are indicated at 96 and 97. The top peripheral edges of the four side walls are coplanar and form a top cover edge 98. The opposite ends of the back wall 95 carry short pivot shafts which are adapted to fit into pivot shaft carriers 85 and 86 in the cover frame 70. One of the pivot shafts is indicated at 100 in FIG. 2. The pivot shafts being rotatably mounted in the pivot shaft carriers permit the cover to rotate between the closed position of FIG. 1 to any of the open positions as indicated in FIG. 2.

The pivot carriers and the pivot shafts are dimensioned so that the shafts can be snapped in and pulled out. The pivot carriers have a lower 180° curvature which corresponds to the diameter of the pivot shaft and at the extreme ends of the carrier instead of terminating the material, the same is slightly continued in the circle so that the space is slightly less than the diameter of the pivot shaft. When a shaft is pressed into a carrier, the same separates and allows the shaft to move fully into position. When the cover is to be pulled out, the carriers expand and permit exit of the pivot shafts.

The cover 93 includes central support section 101 which is joined to the bottoms of the front, back, and side walls and extends downwardly therefrom and is spaced inwardly from the top peripheral edges of the walls to form a carpet cavity 102 which carries carpet 103. The central support section 101 is formed as by a plurality of downwardly extending interconnected flanges 104 which create a strengthening grid.

The front side 94 of the cover has a finger 105 which when the cover is moved to the closed position is cammed inwardly by the slot 87 and when the finger passes the slot it snaps under the flange 80 of the frame to lock the cover in position. A pry-up slot 106 on the cover can receive the end of a screw driver by which the cover can be pryed loose.

The cover frame 70 and cover 93 individually and in combination provide support means for foot, equipment, of wheeled traffic.

The front side 94 of the cover also is formed with an opening 107 which, when the cover is in the closed position, is in vertical alignment with the opening 90 in the cover frame. The opening 107 can be put in an open or a closed condition by the action of a wire retainer as will now be explained. The shape of the wire retainer is shown in FIGS. 6, 7, and 8.

The wire retainer 110 has an elongated body 111 with a continuous planar top surface 112, a pair of side sections 113 and 114 extend outwardly of the body 111 and form a space 115 therebetween. This space 115 has approximately the same cross sectional area as the opening 90 in the frame and the opening 107 in the cover.

The body has wide platform section 116 normal to the top 112 and a narrow platform section 117 normal to the platform section 116. The platform section 117 is also joined to the side sections 113 and 114.

The side sections 113 and 114 carry heads 120 and 121. Each head is configured so that in a direction normal to the top 112 (FIG. 7) the blocking dovetail keys 122 and 123 are formed. In the direction normal to the platform section 116 (FIG. 8) the opening dovetail keys 124 and 125 are formed. As will be apparent, the blocking keys 122 and 123 are at 90° to the opening keys 124 and 125.

If the wire retainer 110 as shown in FIG. 6 is placed over the opening 90 in the frame, and the rotated (into the paper) 90° about the axis of the body, and then is rotated in azimuth 180°, the head 121 will be over the keyway 91 and the head 120 will be over the keyway 92. The opening keys 123 and 122 will be ready to slide respectively in keyway 92 and keyway 91. If the wire retainer 110 is then moved down so the keys slide in the keyways, the retainers will be in the position as shown in FIG. 4. The wide platform 116 is in a position to be engaged with the cover. The opening 115 will be aligned with the opening 107 in the cover. This allows the passage of cables as shown.

When the floor fitting is not in use and the opening 107 in the cover is to be blocked off, the wire retainer 110 is removed from the opening and manipulated so that it assumes the position of FIG. 6 and moved over the opening 90 in the frame. The head 120 will be over the keyway 91 and the head 121 will be over the keyway 92 with the blocking keys 122 and 123 ready to slide in the keyways.

Figure 9:
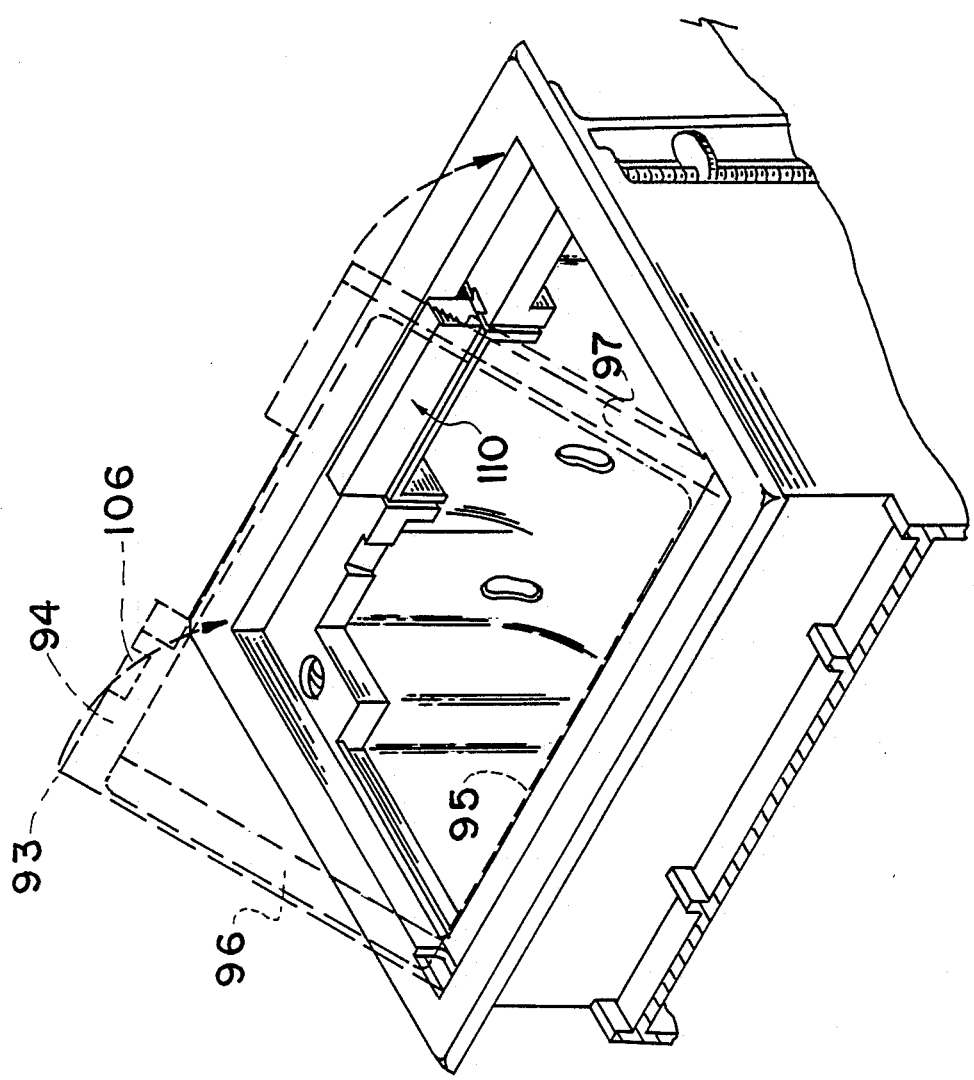
FIG. 9 is a view like in FIG. 4 illustrating the position of the wire retainer to block off the cable passage.

If the wire retainer 110 is then moved down so the keys slide in the keyways, the wire retainer 110 will have assumed the position shown in FIG. 9. It will be seen that the opening 90 in the cover frame is closed and the opening 107 in the cover is also closed. The top 112 is flush with the front flange 74 of the frame and with the front peripheral edge of the cover.

The manner of installing the floor box in the access floor will now be described.

One of the advantages of the floor box is that it ban be assembled above the floor with the cover, power wiring, and necessary communication/data grommets in place so that the access hole in the floor panel can be cut from the top. The power conductor with cable heads are brought out through the opening and plugged into the receptacles in the box. Likewise, the communication/data cables are brought out and threaded through the grommets in the floor box and then brought out through the open cover.

The floor box is tilted with the back side down and slipped into the opening O. (See FIG. 10) As the box is moved inwardly, it is rotated so the rear section fits underneath the floor panel. The cables are pushed inwardly as the box is moved. The arcuate arrangement of the front wall 2 permits this motion. When the box is fully in position, the flanges will engage the panel and then the screws 32 and 33 can be turned to bring the locking tabs 34 and 35 against the underside of the panel and lock the box in position.

The cables from the work station are brought into the box and plugged into the receptacles. The communication/data cables for the work station are also set up. All of the cables are then placed in the frame opening 90 and the wire retainer 110 dropped into the keyways in the position shown in FIG. 4. The cables are now held in position. The cover is closed and the operation is completed.

I claim:
1. A wire retainer comprising:
an elongated body having a blocking surface;
first and second spaced apart side sections respectively extending outwardly from said body in a direction away from said blocking surface;
on said first side section, first head means extending outwardly from the first side section and forming a blocking key and an opening key; and
on said second side section, second head means extending outwardly from the second side and forming a blocking key and an opening key.

2. A wire retainer comprising:
an elongated body having a blocking surface;
first and second spaced-apart side sections respectively extending outwardly from said body in a direction away from said blocking surface;
on said first side section, first head means extending outwardly from the first side section and forming a blocking key and an opening key;
on said second side section, second head means extending outwardly from the second side and forming a blocking key and an opening key;
and said blocking keys extending normal to said blocking surface and said opening keys extending parallel to said blocking surface.

3. The wire retainer of claim 2 wherein said blocking key is a dovetail key and said opening key is a dovetail key.

4. In a flush floor outlet fitting:
annular frame means having interior shoulder means for supporting cover means, the shoulder means being formed with an access opening and a retainer opening in communication with the access opening;
a pair of vertically extending keyway means respectively formed on opposite ends of said retainer opening, each keyway having an open top and a closed bottom;
a wire retainer means including an elongated body having a blocking surface, a pair of spaced-apart side sections respectively extending outwardly from opposite ends of the body, key means extending outwardly respectively from said side sections and disposed respectively in said keyways; and
said key and keyway means providing for the retainer means to be disposed in said retainer opening;
(a) with said blocking surface oriented to prevent passage of cable through said retainer opening; or
(b) with said blocking surface oriented adjacent said access opening and spaced from said frame means to provide for the passage of cable through said retainer opening and to retain the cable in the retainer slot and prevent movement into said access opening.

5. The combination of claim 4 wherein said key and keyway means are dovetailed.

6. In a flush floor outlet fitting:
annular frame means having a frame top and also having interior shoulder means for supporting cover means, the shoulder means being formed with an access opening and a retainer opening in communication with the access opening;

a pair of vertically extending keyway means respectively formed on opposite ends of said retainer opening, each keyway having an open top and a closed bottom;

a wire retainer means including an elongated body having a blocking surface, a pair of spaced-apart side sections respectively extending outwardly from opposite ends of the body, key means extending outwardly respectively from said side sections and disposed respectively in said keyways; and said key and keyway means providing for the retainer means to be disposed in said retainer opening:
  (a) with said blocking surface oriented to prevent passage of cable through said retainer opening; or
  (b) with said blocking surface oriented adjacent said access opening and spaced from said frame means to provide for the passage of cable through said retainer opening and to retain the cable in the retainer slot and prevent movement into said access opening;

cover means having a top edge and being pivotally connected to said annular frame for movement between a closed position and any of a plurality of open positions, in the closed position the cover means engaging said interior shoulder means with said frame top and said cover edge being substantially coplanar;

a cover opening formed in said cover means and the cover opening, when the cover means is in said closed position, being in vertical alignment with said retainer slot; and said vertical alignment in the closed position providing;
  (a) when said wire retainer means is oriented to block passage of cable through the retainer opening for the wire retainer to extend through the cover opening whereby the blocking surface is substantially flush with said top edge and said frame top; and
  (b) for cable passing through said retainer opening to also pass through the cover opening.

7. A wire retainer comprising:
an elongated body having a blocking surface;
a first platform surface extending normal to said blocking surface;
a second platform surface extending normal to said first platform surface;
first and second spaced apart side sections extending outwardly from the body in a direction away from said blocking surface;
on said first side section, first head means extending outwardly from the first side section and forming a blocking key and an opening key; and
on said second side section, second head means forming extending outwardly from the second side section and a blocking key and an opening key.

8. In a flush floor outlet fitting:
frame means having a central access opening and a retainer opening in communication therewith;
cover means pivotally connected with said frame means for movement between a closed position for closing said access opening and an open position for uncovering said access opening;
at least one cover opening formed in said cover means to be aligned with said retainer opening when the cover means is in said closed position, the retainer and cover openings being for the passage of cable; and wire retainer means mountable in said retainer opening to cause the retainer opening to be in a closed condition to prevent the passage of cable or alternatively mountable in the retainer opening to cause the retainer opening to be in an open condition for said passage of cable and to block said communication between the retainer and central openings for retaining cable in the retainer opening and preventing movement into the central opening.

9. In flush floor outlet fitting:
frame means having an access opening and a retainer opening in communication therewith;
cover means pivotally connected with said frame means for movement between a closed position for closing said access opening and an open position for uncovering said access opening;
at least one cover opening formed in said cover means to be aligned with said retainer opening when the cover is in said closed position, the retainer and cover openings being for the passage of cable;
wire retainer means;
key and keyway means disposed as between said retainer opening and said wire retainer means providing for the wire retainer means to be mountable in said retainer opening to prevent the passage of cable or alternatively mountable in the retainer opening to cause the retainer opening to be in an open condition for said passage of cable and to block said communication between the retainer and central openings for retaining cable in the retainer opening and preventing movement into the central opening.

10. In a flush floor outlet fitting:
frame means having a central opening and a retainer opening in communication therewith;
cover means pivotally connected with said frame means for movement between a closed position for closing said central access opening and an open position for uncovering said central access opening;
at least one cover opening formed in said cover means and being aligned with said retainer opening when the cover means is in said closed position, the retainer and cover openings being for the passage of cable;
wire retainer means mountable in said retainer opening to cause, when said cover means is in closed position, said retainer opening and said cover opening to be in a closed condition to prevent said passage of cable and place the fitting in an inactive or abandoned status or alternatively mountable in said retainer opening to cause, when said cover means is in closed position, said retainer opening and said cover opening to be in an open condition for the passage of cable and place the fitting in an activated status; and
when said wire retainer means has conditioned said retainer opening to be in open condition, the wire retainer means closing off said communication between said central opening and said retainer opening to retain cable in the retainer opening and prevent movement into said access opening whereby cable will not interfere with opening and closing of said cover.

11. In a flush floor outlet fitting:
support means;
a retainer opening formed on said support means;
keyway means formed on opposite sides of said retainer opening;
wire retainer means including an elongated body having a blocking surface, a pair of spaced-apart side sections respectively extending outwardly from opposite ends of the body, key means extending outwardly respectively from said side sections and disposed respectively in said keyway means; and
said key and keyway means providing for said retainer means to be disposed in said retainer opening:
(a) with said blocking surface oriented to prevent passage of cable through said retainer opening; or
(b) with said blocking surface oriented to provide for the passage of cable through said retainer opening and to retain the cable in the retainer slot and prevent movement away from the support means into said access opening.

* * * * *